(12) United States Patent
Sánchez De La Fuente et al.

(10) Patent No.: US 11,909,957 B2
(45) Date of Patent: Feb. 20, 2024

(54) ENCODER AND DECODER, ENCODING METHOD AND DECODING METHOD FOR REFERENCE PICTURE RESAMPLING EXTENSIONS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 168 days.

(21) Appl. No.: 17/763,508

(22) PCT Filed: Sep. 24, 2020

(86) PCT No.: PCT/EP2020/076690
§ 371 (c)(1),
(2) Date: Mar. 24, 2022

(87) PCT Pub. No.: WO2021/058638
PCT Pub. Date: Apr. 1, 2021

(65) Prior Publication Data
US 2022/0377317 A1    Nov. 24, 2022

(30) Foreign Application Priority Data
Sep. 24, 2019   (EP) .................................... 19199304

(51) Int. Cl.
*H04N 19/30* (2014.01)
*H04N 19/172* (2014.01)
(Continued)

(52) U.S. Cl.
CPC ......... *H04N 19/105* (2014.11); *H04N 19/132* (2014.11); *H04N 19/172* (2014.11); *H04N 19/30* (2014.11); *H04N 19/46* (2014.11)

(58) Field of Classification Search
None
See application file for complete search history.

(56) References Cited

U.S. PATENT DOCUMENTS 9,635,371 B2    4/2017  Seregin et al.
2013/0089135 A1    4/2013  Chen et al.
(Continued)

FOREIGN PATENT DOCUMENTS

WO    WO 2018/002425    1/2018
WO    WO 2021/026361    2/2021

OTHER PUBLICATIONS

ISO/IEC, ITU-T. "High efficiency video coding". TU-T Recommendation H.265 ISO/IEC 23008 10 (HEVC), edition 1, 2013; edition 2, 2014.
(Continued)

*Primary Examiner* — Jessica M Prince
(74) *Attorney, Agent, or Firm* — NIXON & VANDERHYE P.C.

(57) ABSTRACT

A video decoder (151) for decoding an encoded video signal comprising encoded picture data to reconstruct a plurality of pictures of a video sequence of a video. The video decoder (151) comprises an input interface (160) configured for receiving the encoded video signal comprising the encoded picture data. Moreover, the video decoder (151) comprises a data decoder (170) configured for reconstructing the plural-
(Continued)

ity of pictures of the video sequence depending on the encoded picture data. Moreover, further video decoders, video encoders, systems, methods for encoding and decoding, computer programs and encoded video signals according to embodiments are provided.

16 Claims, 10 Drawing Sheets

(51) Int. Cl.
*H04N 19/105* (2014.01)
*H04N 19/132* (2014.01)
*H04N 19/46* (2014.01)

(56) References Cited

U.S. PATENT DOCUMENTS

| | | | | |
|---|---|---|---|---|
| 2021/0014497 | A1* | 1/2021 | Topiwala | H04N 19/132 |
| 2022/0159262 | A1* | 5/2022 | Chen | H04N 19/30 |
| 2022/0272378 | A1* | 8/2022 | Samuelsson | H04N 19/117 |
| 2022/0360802 | A1* | 11/2022 | Kalva | H04N 19/112 |

OTHER PUBLICATIONS

Samuelsson, J et al., "AHG 8: Adaptive Resolution Change (ARC) High-Level Syntax (HLS)", Joint Video Experts Team (JVET) of ITU-T SG 16 WP 3 and ISO/IEC JTC 1/SC 29/WG 11, JVET-O0204, 15th Meeting: Gothenburg, SE, Jul. 3-12, 2019 [JVET-O0204-v3.docx] (version 3—date Jul. 5, 2019) [1], pp. 1-6.

Bross, Benjamin et al., Versatile Video Coding (Draft 9), JVET-R2001 (version 7), ITU, May 3, 2020, pp. 45-48, 113-120, 282-285.

Chen Jianle et al: "Resampling Process of the Scalable High Efficiency Video Coding", Data Compression Conference. Proceedings, IEEE Computer Society, Piscataway, NJ, US, Apr. 7, 2015 (Apr. 7, 2015), pp. 23-32.

Sanchez, Yago et al., AHG8: On Reference Picture Resampling, JVET-P0482 (version 1), ITU, Sep. 25, 2019, pp. 1-4.

Stephan Wenger, et al., "[AHG19] On Signaling of Adaptive Resolution Change", 14. JVET Meeting; Mar. 19, 2019-Mar. 27, 2019; Geneva; (The Joint Video Exploration Team of ISO/IEC JTC1/SC29/WG11 and ITU-T SG.16)., No. JVET-N0052, Mar. 13, 2019, 11 pages.

International Search Report for PCT/EP2020/076690 dated Jan. 12, 2021, 6 pages.

Written Opinion of the ISA for PCT/EP2020/076690 dated Jan. 12, 2021, 11 pages.

* cited by examiner

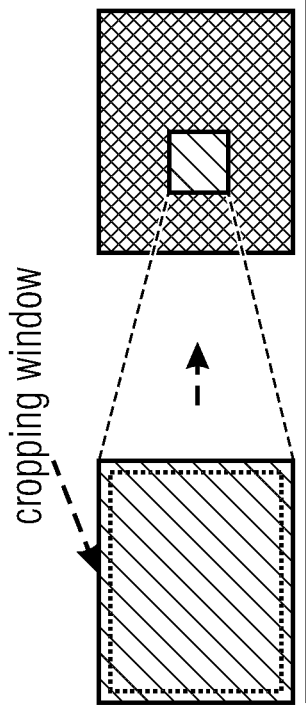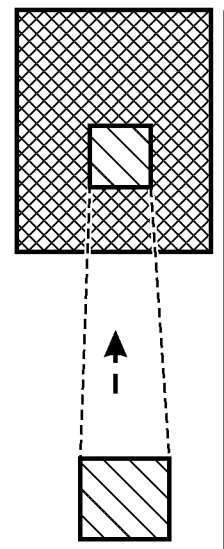
Fig. 6b

ENCODER AND DECODER, ENCODING METHOD AND DECODING METHOD FOR REFERENCE PICTURE RESAMPLING EXTENSIONS

This application is the U.S. national phase of International Application No. PCT/EP2020/076690 filed Sep. 24, 2020 which designated the U.S. and claims priority to EP Patent Application No. 19199304.7 filed Sep. 24, 2019, the entire contents of each of which are hereby incorporated by reference.

The present invention relates to video encoding and video decoding and, in particular, to an encoder and a decoder, to an encoding method and to a decoding method for Reference Picture Resampling extensions.

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following, an introduction to VCL partitioning according to the state-of-the-art is described (VCL=video coding layer).

Typically, in video coding, a coding process of picture samples requires smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

Other examples relate to RoI (RoI=Region of Interest) encodings, where there is for example a region in the middle of the picture that viewers can select e.g. with a zoom in operation (decoding only the RoI), or gradual decoder refresh (GDR) in which intra data (that is typically put into one frame of a video sequence) is temporally distributed over several successive frames, e.g. as a column of intra blocks that swipes over the picture plane and resets the temporal prediction chain locally in the same fashion as an intra picture does it for the whole picture plane. For the latter, two regions exist in each picture, one that is recently reset and one that is potentially affected by errors and error propagation.

Reference Picture Resampling (RPR) is a technique used in video coding to adapt the quality/rate of the video not only by using a coarser quantization parameter but by adapting the resolution of potentially each transmitted picture. Thus, references used for inter prediction might have a different size that the picture that is currently being predicted for encoding. Basically, RPR requires a resampling process in the prediction loop, e.g., upsampling and downsampling filters to be defined.

Depending on flavor, RPR can result in a change of coded picture size at any picture, or be limited to happen at only some particular picture, e.g. only at particular positions bounded for instance to segment boundaries adaptive HTTP streaming.

The object of the present invention is to provide improved concepts for video encoding and video decoding.

The object of the present invention is solved by the subject-matter of the independent claims.

Preferred embodiments are provided in the dependent claims.

In the following, embodiments of the present invention are described in detail with reference to the figures, in which.

Figure 5B:
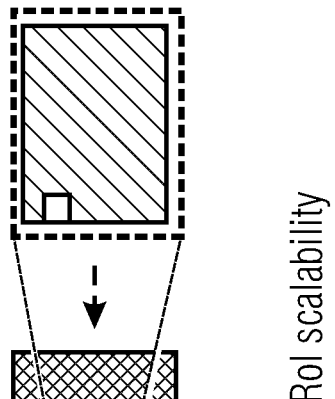
Figure 5A:
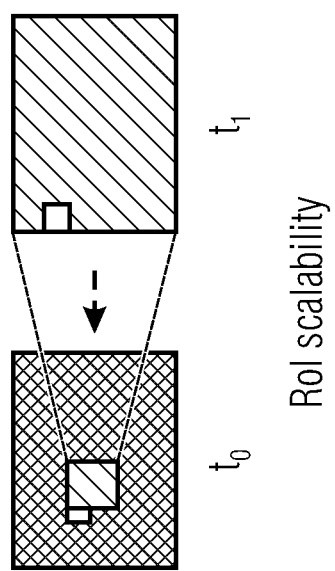

FIG. 5*a* depicts a first illustration of content pieces (grey) move within picture over time.

FIG. 5*b* depicts a second illustration of content pieces (grey) move within picture over time.

Figure 6A:
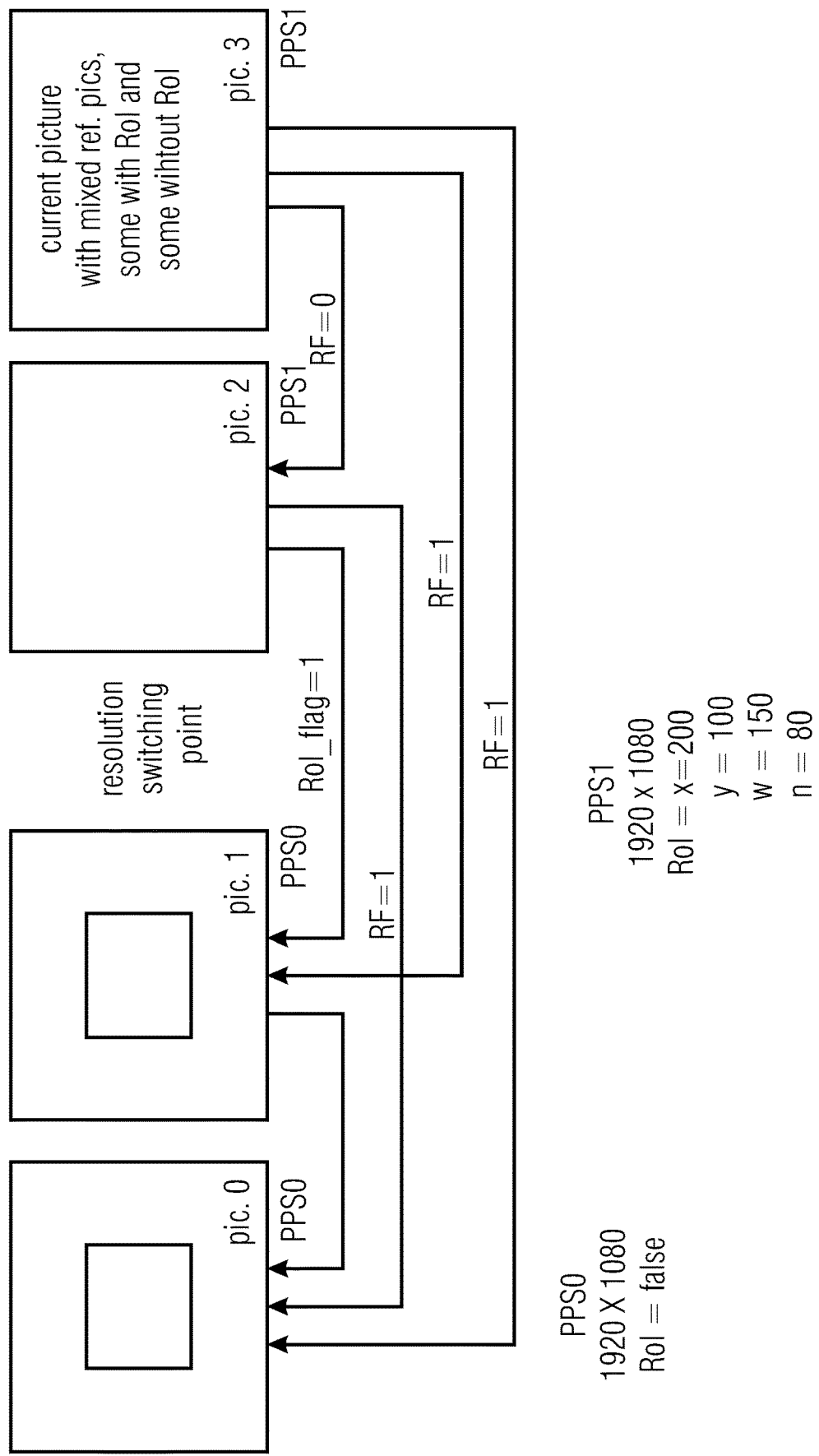

FIG. 6*a* illustrates a current picture with mixed reference pictures.

FIG. 6*b* illustrates an example for ignoring a cropping window of a referenced picture.

Figure 7:
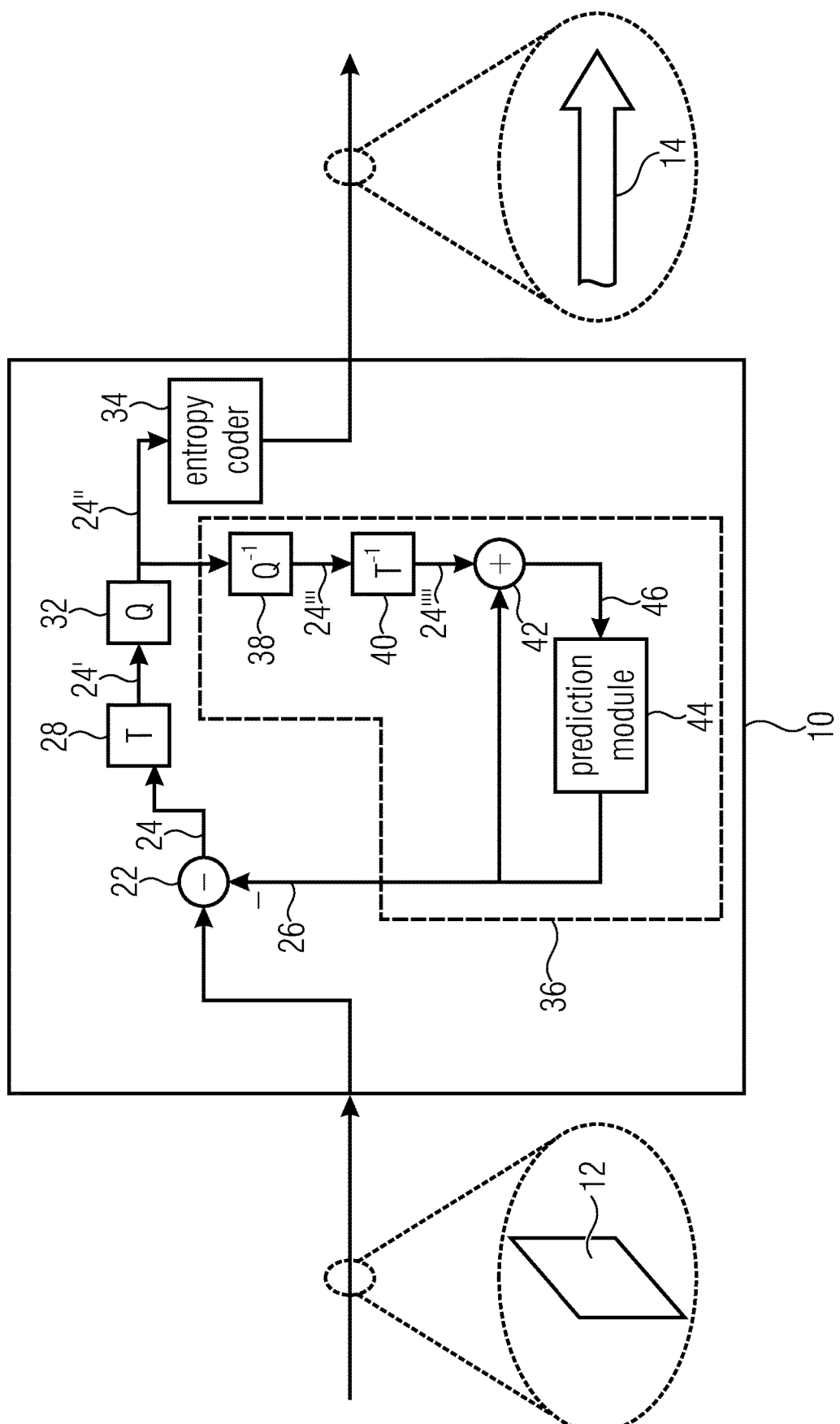

FIG. 7 illustrates a video encoder.

Figure 8:
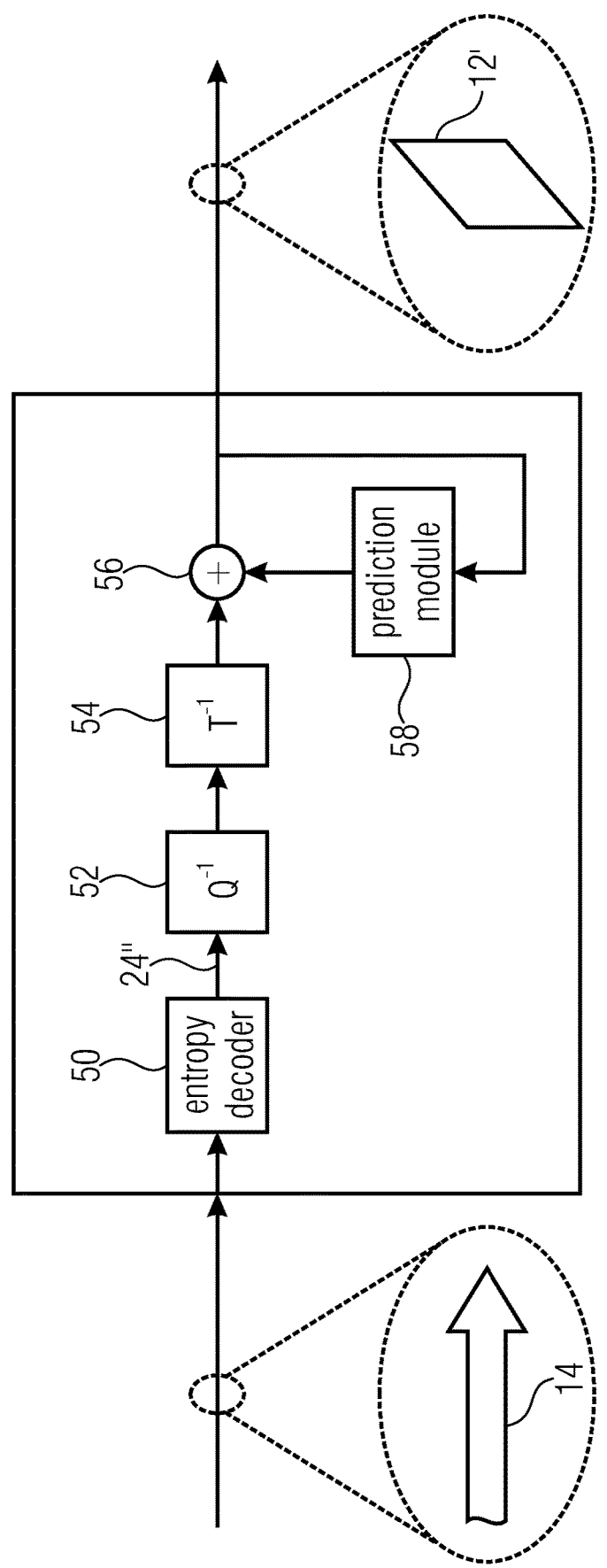

FIG. 8 illustrates a video decoder.

Figure 9:
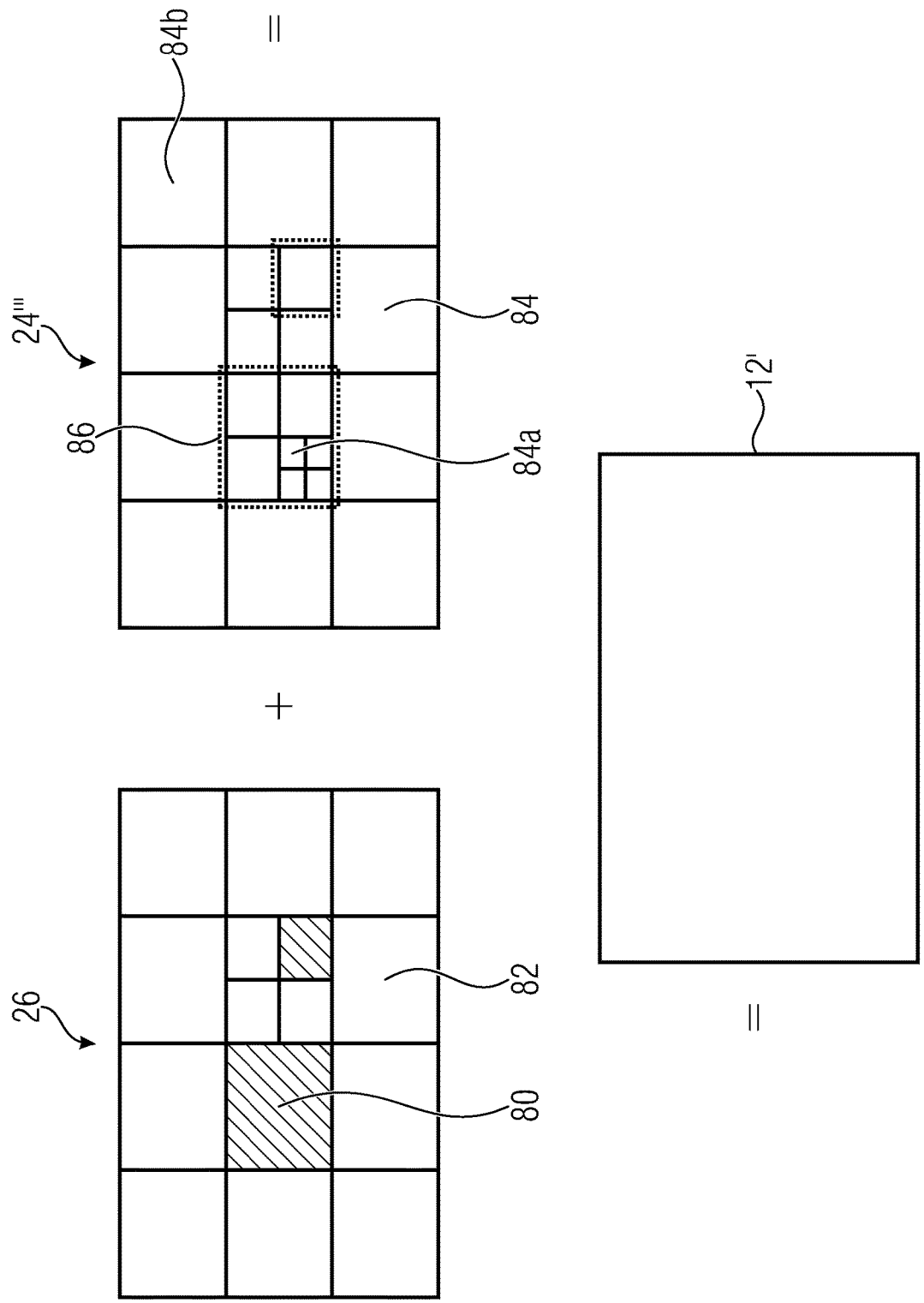

FIG. 9 illustrates the relationship between the reconstructed signal, e.g., the reconstructed picture, on the one hand, and the combination of the prediction residual signal as signaled in the data stream, and the prediction signal, on the other hand.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 7 to FIG. 9. Thereinafter the description of embodiments of the concept of the present invention is presented along with a description as to how such concepts could be built into the encoder and decoder of FIG. 7 and FIG. 8, respectively, although the embodiments described with FIG. 1 to FIG. 3 and following, may also be used to form encoders and decoders not operating according to the coding framework underlying the encoder and decoder of FIG. 7 and FIG. 8.

FIG. 7 shows a video encoder, an apparatus for predictively coding a picture 12 into a data stream 14 exemplarily using transform-based residual coding. The apparatus, or encoder, is indicated using reference sign 10. FIG. 8 shows a corresponding video decoder 20, e.g., an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 7 and FIG. 8 exemplarily use transform based prediction residual coding, although embodiments of the present application are not restricted to this kind of prediction residual coding. This is true for other details described with respect to FIG. 7 and FIG. 8, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, e.g., from the picture 12. The prediction residual signal former 22 may, for instance, be a subtractor which subtracts the prediction signal from the original signal, e.g., from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 7, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, e.g., a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, e.g., a reconstruction of the original signal 12. Reconstructed signal 46 may correspond to signal 12'. A prediction module 44 of prediction stage 36 then generates the prediction signal 26 on the basis of signal 46 by using, for instance, spatial prediction, e.g., intra-picture prediction, and/or temporal prediction, e.g., inter-picture prediction.

Likewise, decoder 20, as shown in FIG. 8, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 8, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, e.g., coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

FIG. 9 illustrates the relationship between the reconstructed signal, e.g., the reconstructed picture 12', on the one hand, and the combination of the prediction residual signal 24" as signaled in the data stream 14, and the prediction signal 26, on the other hand. As already denoted above, the combination may be an addition. The prediction signal 26 is illustrated in FIG. 9 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 9 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 9 is also illustrated as a subdivision of the picture area into blocks 84. These blocks might be called transform blocks in order to distinguish same from the coding blocks 80 and 82. In effect, FIG. 9 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, e.g., each coding block 80 and 82, may concurrently form a transform block 84, but FIG. 9 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, e.g., the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 9 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 9, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 7 to FIG. 9 have been presented as an example where the inventive concept described further below may be implemented in order to form specific examples for encoders and decoders according to the present application. Insofar, the encoder and decoder of FIG. 7 and FIG. 8, respectively, may represent possible implementations of the encoders and decoders described herein below. FIG. 7 and FIG. 8 are, however, only examples. An encoder according to embodiments of the present application may, however, perform block-based encoding of a picture 12 using the concept outlined in more detail below and being different from the encoder of FIG. 7 such as, for instance, in that same is no video encoder, but a still picture encoder, in that same does not support inter-prediction, or in that the sub-division into blocks 80 is performed in a manner different than exemplified in FIG. 9. Likewise, decoders according to embodiments of the present application may perform block-based decoding of picture 12' from data stream 14 using the coding concept further outlined below, but may differ, for instance, from the decoder 20 of FIG. 8 in that same is no video decoder, but a still picture decoder, in that same does not support intra-prediction, or in that same sub-divides picture 12' into blocks in a manner different than described with respect to FIG. 9 and/or in that same does not derive the prediction residual from the data stream 14 in transform domain, but in spatial domain, for instance.

In the following, a generic video encoder according to embodiments is described in FIG. 1, a generic video decoder according to embodiments is described in FIG. 2, and a generic system according to embodiments is described in FIG. 3.

Figure 1:
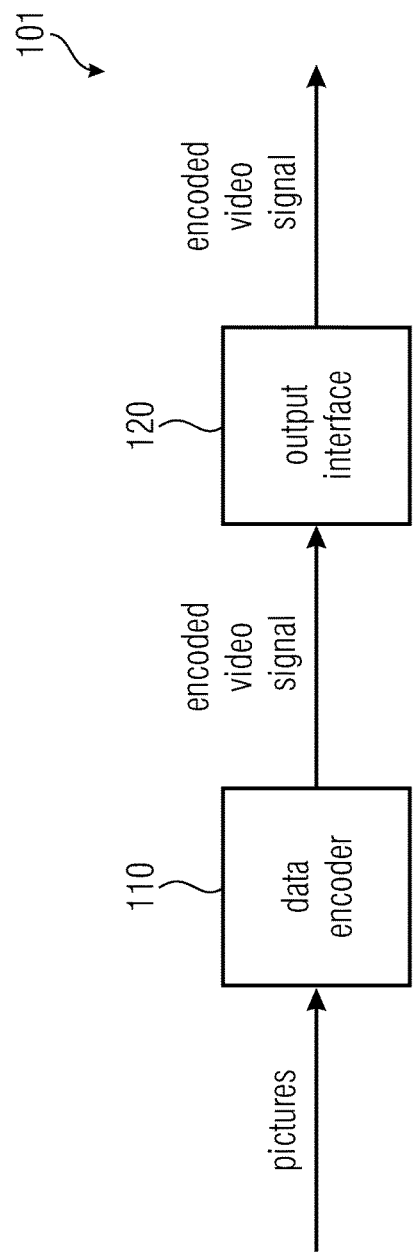
FIG. 1 illustrates a video encoder according to an embodiment.

FIG. 1 illustrates a generic video encoder 101 according to embodiments.

The video encoder 101 is configured for encoding a plurality of pictures of a video by generating an encoded video signal, wherein each of the plurality of pictures comprises original picture data.

The video encoder 101 comprises a data encoder 110 configured for generating the encoded video signal comprising encoded picture data, wherein the data encoder is configured to encode the plurality of pictures of the video into the encoded picture data.

Moreover, the video encoder 101 comprises an output interface 120 configured for outputting the encoded picture data of each of the plurality of pictures.

Figure 2:
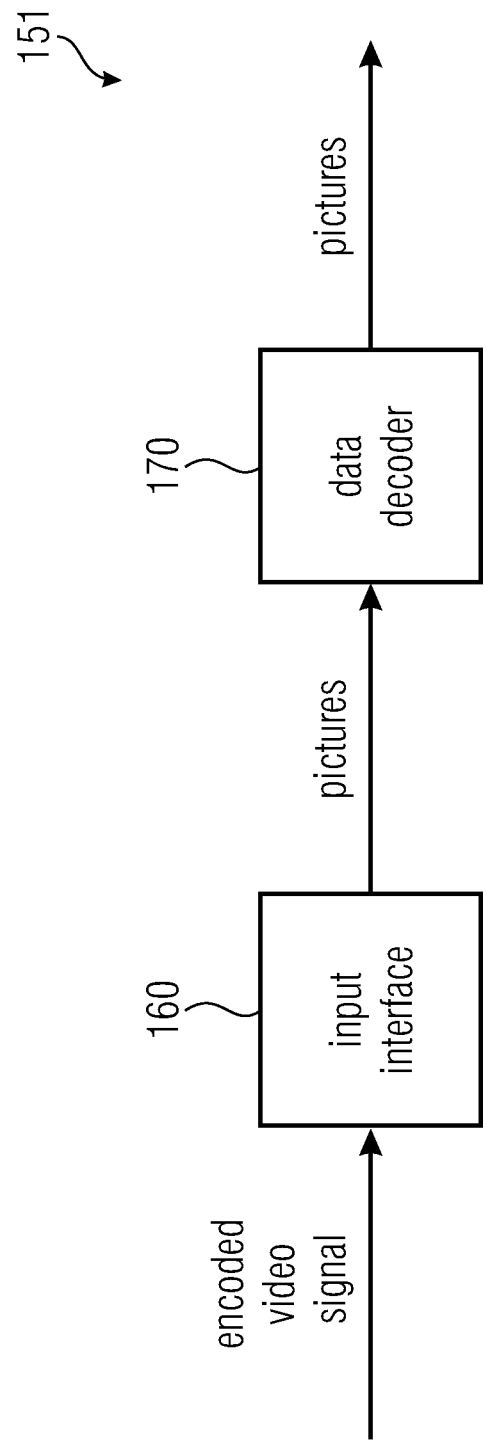
FIG. 2 illustrates a video decoder according to an embodiment.

FIG. 2 illustrates a generic video decoder 151 according to embodiments.

The video decoder 151 is configured for decoding an encoded video signal comprising encoded picture data to reconstruct a plurality of pictures of a video.

The video decoder 151 comprises an input interface 160 configured for receiving the encoded video signal.

Moreover, the video decoder comprises a data decoder 170 configured for reconstructing the plurality of pictures of the video by decoding the encoded picture data.

Figure 3:
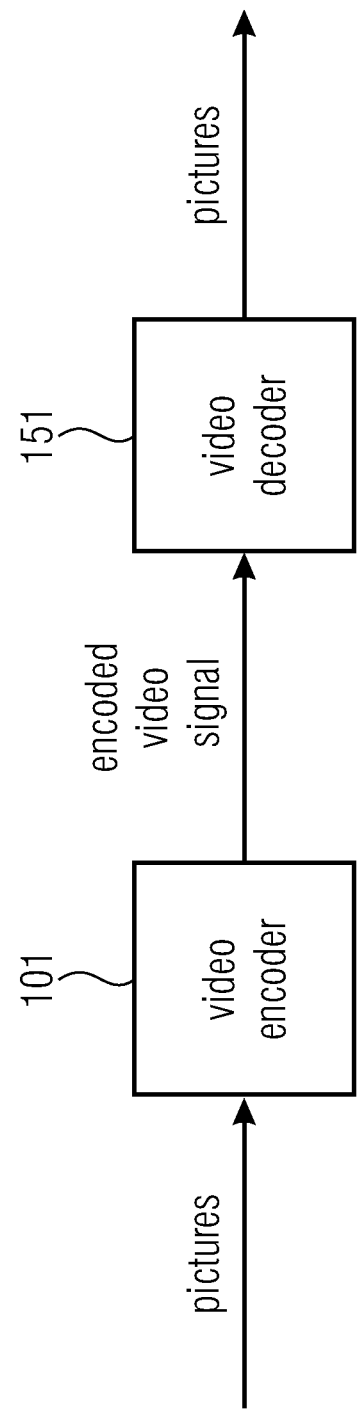
FIG. 3 illustrates a system according to an embodiment.

FIG. 3 illustrates a generic system according to embodiments.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

A first aspect of the invention is claimed in claims 1 to 33. The first aspect provides sample aspect ratio signalling.

A second aspect of the invention is claimed in claims 34 to 72. The second aspect provides Reference Picture Resampling restrictions to lessen implementation burdens.

A third aspect of the invention is claimed in claims 73 to 131. The third aspect provides a flexible region-based referencing for zooming for Reference Picture Resampling, and, in particular, provides more efficient address zoom use cases.

In the following, the first aspect of the invention is now described in detail.

In particular, the first aspect provides sample aspect ratio signalling.

Sample aspect ratio (SAR) is relevant to correctly present coded video to the consumer so that when the aspect ratio of the coded sample array changes over time through RPR (e.g. by subsampling in one dimension), the aspect ratio of the presented picture can stay constant as intended.

The state-of-the-art SAR signalling in the Video Usability Information (VUI) in the sequence parameter set (SPS) such as in HEVC or AVC only allows to set a constant SAR for a whole coded video sequence, e.g., SAR changes are only allowed at the start of a coded video sequence (e.g., sample aspect ratio is constant per coded video sequence).

Therefore, as part of the invention, a new mode of SAR signalling is introduced to video coding. The sequence level parameter set, e.g. the SPS contains an indication that
RPR is in use (hence coded picture size may change)
no actual SAR is given in VUI,
instead, SAR of the coded video is indicated as dynamic and may change within the CVS (coded video sequence)
actual SAR of coded pictures is indicated through SEI (supplemental enhancement information) messages at resolution switching points

| | Descriptor |
|---|---|
| vui_parameters( ) { | |
|   aspect_ratio_info_present_flag | u(1) |
|   if( aspect_ratio_info_present_flag ) { | |
|     aspect_ratio_idc | u(8) |
|     if( aspect_ratio_idc = = EXTENDED_SAR ) { | |
|       sar_width | u(16) |
|       sar_height | u(16) |
|     } | |
|   } else { | |
|     if (sps_rpr_enabled_flag ) | |
|       aspect_ratio_dynamic_sei_present_flag | u(1) |
|   } | |
| [...] | |

Dynamic SAR Information SEI Message

| | Descriptor |
|---|---|
| dynamic_sar_info( payloadSize ) { | |
|   sar_cancel_flag | u(1) |
|   if( !sar_cancel_flag ) { | |
|     sar_persistence_flag | u(1) |
|     sei_aspect_ratio_idc | u(8) |
|     if( sei_aspect_ratio_idc = = EXTENDED_SAR ) { | |
|       sei_sar_width | u(16) |
|       sei_sar_height | u(16) |
|     } | |
|   } | |
| } | |

Likewise, a vui_aspect_ratio_constant flag may, e.g., be employed.

The flag vui_aspect_ratio_constant flag may, e.g., be an indication indicating whether a sample aspect ratio is constant for the video sequence or whether the sample aspect ratio is changeable within the video sequence.

For example, if the vui_aspect_ratio_constant flag may, e.g., be set to 0 (or may, e.g., be set to FALSE, or may, e.g., be set to −1), this may, e.g., indicate that dynamic SAR information, e.g., in the SEI message, is present.

In an alternative embodiment, the SAR information in the VUI (e.g., SPS) is used as a default, which is used as long as no SEI message is available. The information in the SEI message will override in information in the SPS.

| | Descriptor |
|---|---|
| vui_parameters( ) { | |
|   default_aspect_ratio_info_present_flag | u(1) |
|   if( default_aspect_ratio_info_present_flag ) { | |
|     default_aspect_ratio_idc | u(8) |
|     if( default_aspect_ratio_idc = = EXTENDED_SAR ) { | |
|       default_sar_width | u(16) |
|       default_sar_height | u(16) |
|     } | |
|   } | |
|   if (sps_rpr_enabled_flag ) | |
|     aspect_ratio_dynamic_sei_present_flag | u(1) |
| [...] | |

In another embodiment the SAR information is associated with the picture resolution and signalled in the PPS (picture parameter set), where the picture resolution is signalled. A default SAR is signalled in the SPS, if the SAR changes for a certain picture resolution, a different SAR is signalled, overriding the default SAR.

SPS VUI:

|  | Descriptor |
|---|---|
| vui_parameters( ) { | |
|   default_aspect_ratio_info_present_flag | u(1) |
|   if(default_aspect_ratio_info_present_flag ) { | |
|     default _aspect_ratio_idc | u(8) |
|     if(default_aspect_ratio_idc = = EXTENDED_SAR ) { | |
|       default _sar_width | u(16) |
|       default _sar_height | u(16) |
|     } | |
|   } | |
| [...] | |

And as for the SEI case, the SPS could additionally indicate that the SAR might change and that the SAR is updated into the PPS (similar to aspect_ratio_dynamic_sei_present_flag before). Thus, it could be possible to constraint or restrict the SAR no to be changed for some applications making it easier implementation or RPR/ARC.

PPS:

|  | Descriptor |
|---|---|
| vui_parameters( ) { | |
|   [...] | |
|   pps_aspect_ratio_info_present_flag | u(1) |
|   if(pps_aspect_ratio_info_present_flag ) { | |
|     pps_aspect_ratio_idc | u(8) |
|     if(pps_aspect_ratio_idc = = EXTENDED_SAR ) { | |
|       pps_sar_width | u(16) |
|       pps_sar_height | u(16) |
|     } | |
|   } | |
| [...] | |

If pps_aspect_ratio_info_present_flag is set to 0 the default SAR is taken from the SPS and if not the actual SAR is provided.

In the following, the second aspect of the invention is now described in detail.

In particular, the second aspect provides a signalling on constraints for reference picture resampling.

Restricting the RPR scheme in various ways allows to lessen the implementation burden. With a general RPR scheme that does not include additional restrictions like in the following invention, an implementor would have to overprovision its decoder hardware to perform:

resampling at an arbitrary current picture, worst case: every picture resampling of any picture in the DPB (decoded picture buffer), mid-GOP (group of pictures) vs. defined positions with lesser reference pictures simultaneous resampling of multiple pictures of varying resolution to the target resolution cascaded resampling chain of ref pic with (reference) picture quality loss The invented restrictions in the following allow to reduce the implementation cost of a codec that features such a restricted RPR scheme compared to an unrestricted RPR codec.

In one embodiment, the resolution change is allowed only at RAP (random access point), e.g., the maximum number of resampled pictures is the amount of RASL (random access decodable skipped picture) pictures at this RAP and RAPs usually come at a distance of one or more GOPs, e.g., dozens of pictures apart, which reduces the worst case rate at which such resample operations must be supported.

In another embodiment, the resolution change is allowed only at key pictures within a hierarchical GOP, e.g., pictures which are of the lowest temporal layer, and that occur once in every GOP, and and all picture following in coding order have a lower POC (e.g., earlier presentation time stamp), so that when reference pictures are resampled, none of the immediately following pictures within the GOP of higher temporal layers require cascaded up-/downsampling.

According to another embodiment, the resolution change is allowed only at the picture that immediately follows a key picture in presentation order, or in other words, the first picture of the next GOP in presentation order.

In another embodiment, the temporal distance between consecutive resolution changes is restricted by a minimum POC (picture order count) distance in the level definition.

In another embodiment, the temporal distance between consecutive resolution changes is restricted by a minimum number of coded pictures in-between in the level definition.

In another embodiment, the resolution changes may only occur at pictures marked as non-discardable or as a reference picture by non_reference_picture_flag equal 0.

In another embodiment, the rate of resolution changes is restricted by a level definition.

In another embodiment, the resampling of reference pictures for a current picture is restricted to use a single resampling ratio, e.g., all reference pictures of the current picture with a different resolution than the current picture are required to have the same resolution.

In another embodiment, when one reference picture of the current picture requires resampling, all reference pictures of the current picture are required to use resampling, e.g., be on the same original resolution the one reference picture.

In another embodiment, only one reference picture of the current picture is allowed to require resampling.

According to another embodiment, the maximum number of pictures that require resampling at a resolution change point is optionally indicated in the coded video sequence/bitstream as a guarantee for decoder and when the indication is not present, it is inferred or indicated by the level definitions.

In another embodiment, the original (not-resampled) reference picture is removed from the reference picture list and/or decoded picture buffer, e.g., marked as unused for reference, after being resampled so that only the resampled reference picture is available from thereon.

In another embodiment, the resampling ratios that are used within a coded video sequence are limited to a set of resampling ratios included into a parameter set with sequence or bitstream scope (decoding parameter set, DPS; sequence parameter set, SPS).

In the following, the third aspect of the invention is now described in detail.

In particular, the second aspect provides a flexible region-based referencing for zooming for Reference Picture Resampling.

As discussed above, in layered codecs such as SHVC and SVC, two modes of advanced scalability are addressed, namely RoI scalability (a region of the lower layer picture is magnified in the higher layer) and extended scalability (the lower layer picture is extended through additional content in the higher layer) as shown below in FIG. 4.

Extended scalability may, e.g., refer to the use case which is colloquially referred to as zooming-out, e.g., a use case in which the video temporally changes in the sense that it covers more content, e.g. larger capturing angle, more parts of the scene, larger region altogether, etc.

Figure 4:
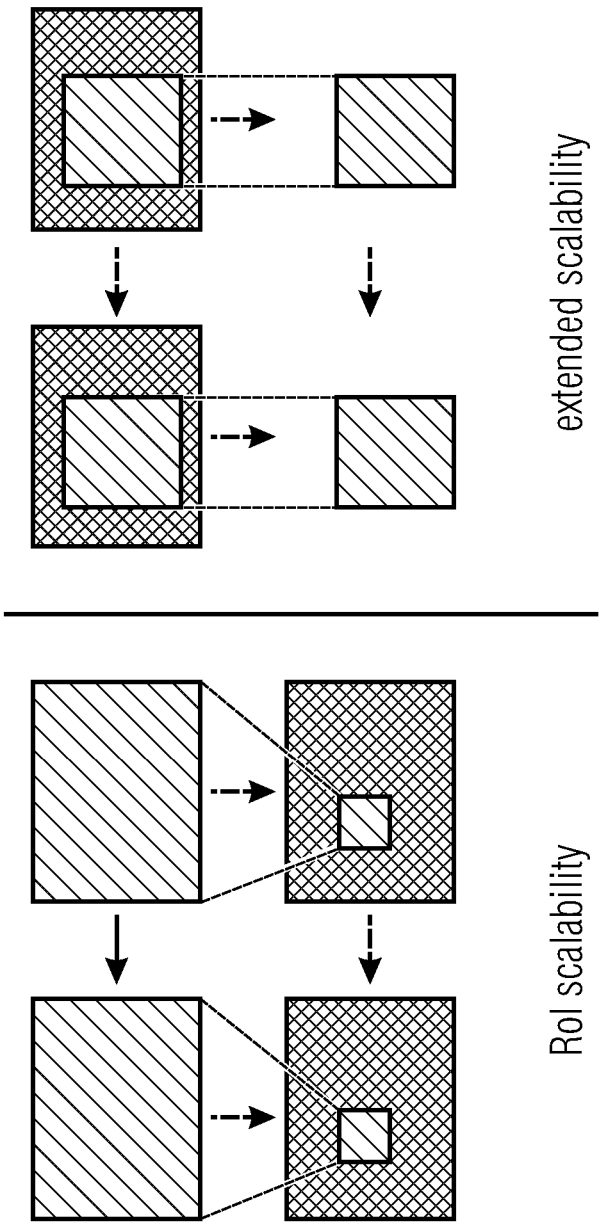
FIG. 4 illustrates Region of Interest (RoI) scalability versus extended scalability.

FIG. 4 illustrates Region of Interest (RoI) scalability versus extended scalability.

In a scenario where zooming in and out is allowed when zooming and moving regions are defined that are used for prediction and to be predicted. This is known as RoI scalability (typically zoom in) or extended scalability (typically zoom out). In RoI scalability with scalable coding typically a region is defined in the reference picture that is upscaled to the dimensions of the referring picture. However, in scalable coding higher and lower layer pictures between which prediction is performed depict the same time instant.

Since for SHVC and SVC this was done for layered coding and in those cases the collocated base layer does not represent any movement, e.g., the corresponding samples in the base layer are known, it was possible to upscale a known region in the base layer fully and operate on that upscaled reference.

However, in RPR applications, the two pictures between which prediction is performed between do not depict the same time instance, and hence, some content out of the defined region could move from time instance A (low resolution) to time instant B (high resolution) into the zoomed in/out area. Disallowing referencing those regions for prediction is detrimental for coding efficiency.

However, for RPR the reference could point to some area outside the corresponding reference region, e.g. due to an object moving into the RoI zoomed in area. This is shown in FIG. 5a without actually changing the coded resolution:

FIG. 5a depicts a first illustration of content pieces (grey) move within picture over time.

In a first embodiment a reference region is defined that includes a larger area than that of the RoI so that the grey box in the figure that comes into the RoI zoomed area is in the reference:

FIG. 5b depicts a second illustration of content pieces (grey) move within picture over time.

This would lead to reconstruct for the picture corresponding to the RoI an area a bit larger than the RoI and the additional area would be removed by indicating the cropping window. The problem arises from the fact that the scaling factor used to upsample the references is computed in WC (Versative Video Coding) from the cropped out pictures. First assuming that there is no RoI, the horizontal scale factor HorScale and the vertical scale factor VerScale would be computed as:

HorScale=CroppedOutWidthPic/CroppedOutWidthRefPic

VerScale=CroppedOutHeightPic/CroppedOutHeightRefPic

The reason for indicating the ratio based on the cropped-out pictures is that depending on the pictures sizes of interest some additional samples need to be decoded as the codec requires the sizes to be multiple of a minimum size (in WC 8 samples). Therefore, if any of the Pic or RefPic are not multiple of 8 some samples would be added to the input picture to achieve them to be multiple of 8 and the ratios would become different and lead to a wrong scaling factor. This issue can become even worse in case that the bitstreams are desired to be encoded as "mergeable"—e.g., that they can be merged to other bitstream—as in that case the picture sizes need to be multiple of CTU sizes, that go up to 128. Therefore, the correct scaling factor needs to account for the cropping window.

In the described scenario (combining RPR with RoI), making use of the cropping window for including some additional references, the use of the cropping window would be inadequate. As described, one could define a RoI in the reference picture a bit larger that can be used for reference but is discarded with the cropping window in the current reconstructed picture. However, if the horizontal scale factor HorScale and the vertical scale factor VerScale were computed as:

HorScale=CroppedOutWidthPic/WidthEnlargedRefRoI

VerScale=CroppedOutHeightPic/HeightEnlargeRefRoI the result would not be correct as some of the samples in the enlarged RoI actually correspond to samples in the cropped-out region.

In the following, a cropping window based concept according to a first group of embodiments is described.

Therefore, in said first group of embodiments, the computation may, e.g., be as follows:

HorScale=CodedPicWidth/RefRoIWidth

VerScale=CodedPicHeight/RefRoIHeight which would include the samples that are to be cropped out for the computation of the scale factors.

Regarding the signalling, in one embodiment, the signalling of the enlarged RoI would indicate that the cropping window information is to be ignored in the scaling factor computation.

In another embodiment it is indicated in the bitstream (e.g. Parameter set or slice header) whether the cropping window needs to be taken into account or not for the computation of the scale factors.

| | Descriptor |
|---|---|
| pic_parameter_set( ) { | |
| ... | |
|   roi_offset_present_flag | u(1) |
|   if( scaled_ref_layer_offset_present_flag) { | |
|     roi_left_offset | se(v) |
|     roi_top_offset | se(v) |
|     roi_right_offset | se(v) |
|     roi_bottom_offset | se(v) |
|   } | |
|   use_cropping_for_scale_factor_derivation_flag | u(1) |
| } | |

The cropping window may, e.g., also be referred to as conformance cropping window. The offsets for the cropping window/the conformance cropping window may, e.g., also be referred to as pps_conf_win_left_offset, pps_conf_win_top_offset, pps_conf_win_right_offset, and pps_conf_win_botton_offset.

Instead of using the flag use_cropping_for_scale_factor_derivation_flag for deciding whether or not information within the encoded video signal on a cropping window shall be ignored for upscaling a region within the reference picture (or for deciding whether or not information within the encoded video signal on a cropping window shall be used for upscaling the region within the reference picture) a flag pps_scaling_window_explicit_signalling_flag may, e.g., be used.

For example, if the flag pps_scaling_window_explicit_signalling_flag is set to 0 (or, e.g., is set to FALSE, or, e.g., is set to −1), the information within the encoded video signal on the cropping window may, e.g., be used for upscaling a region within the reference picture. And, for example, if the flag pps_scaling_window_explicit_signalling_flag is set to 1 (or, e.g., is set to TRUE), the information within the encoded video signal on the cropping window may, e.g., be ignored for upscaling a region within the reference picture.

One of the drawbacks of the above approach is that in order to allow referencing samples outside the RoI, e.g., referencing samples onto the enlarged RoI, the area that is decoded for the current picture becomes larger. More concretely, samples are decoded in an area outside of the RoI that later are discarded with the cropping window. This leads to an additional sample overhead and coding efficiency reduction which could potentially counter the coding efficiency gains of allowing referencing outside the corresponding RoI in the reference picture.

A more efficient approach would be to only decode the RoI (omitting about the necessary additional samples to make the picture multiple of 8 or CTU as discussed before) but allow referencing samples within the enlarged RoI.

In the following, a bounding box based concept according to a second group of embodiments is described.

In said second group of embodiments, the samples outside red rectangle but within the green box (RoI offset plus additional RoI offset) are used for determining the resampled ref pic instead of only using the red RoI.

The size of a bounding box for MVs around red cut out is defined/signalled with the advantage of limiting memory access/line buffer requirements and also allowing implementations with pic-wise upsampling approach.

Such a signalling could be included into the PPS (additional_roi_X):

| | Descriptor |
|---|---|
| pic_parameter_set( ) { | |
| ... | |
| roi_offset_present_flag | u(1) |
| if( scaled_ref_layer_offset_present_flag) { | |
| roi_left_offset | se(v) |
| roi_top_offset | se(v) |
| roi_right_offset | se(v) |
| roi_bottom_offset | se(v) |
| } | |
| additional_roi_offset_present_flag | u(1) |
| if( additional_roi_offset_present_flag) { | |
| additional_roi_left_offset | ue(v) |
| additional_roi_top_offset | ue(v) |
| additional_roi_right_offset | ue(v) |
| additional_roi_bottom_offset | ue(v) |
| } | |

Therefore, the derivation of the scaling factor would be as follows:

HorScale=CroppedOutWidthPic/RefRoIWidth

VerScale=CroppedOutHeightPic/RefRoIHeight

In one embodiment the reference sample would be identified by finding the collocated sample using the roi_X_offsets and applying the MVs, which would be clipped if the reference sample is outside the enlarged RoI indicated by additional_roi_x. Or alternatively, the samples outside this enlarged RoI would be padded with the last sample within the enlarged RoI.

In another embodiment, this enlarged RoI is only used as a restriction or constraint that can be used for implementation optimizations. E.g., if the reference picture is first completely upsampled as required instead of on-the-fly (block-based), only the enlarged RoI is resampled instead of the whole picture, saving a lot of processing.

A further issue, is when more than one reference picture is used at the same time. In that case, it is necessary to identify the picture to which the RoI region information applies. In such a case, instead of addition the information to the PPS the slice header would indicate that some of the entry in the reference list do not reference the whole picture but a part thereof. E.g.,

| | Descriptor |
|---|---|
| slice_header( ) { | |
| slice_pic_parameter_set_id | ue(v) |
| ... | |
| if( ( nal_unit_type != IDR_W_RADL && nal_unit_type != IDR_N_LP ) \|\| sps_idr_rpl_present_flag ) { | |
| for( i = 0; i < 2; i++ ) { | |
| if( num_ref_pic_lists_in_sps[ i ] > 0 && !pps_ref_pic_list_sps_idc[ i ] && ( i = = 0 \|\| ( i = = 1 && rpl1_idx_present_flag ) ) ) | |
| ref_pic_list_sps_flag[ i ] | u(1) |
| if( ref_pic_list_sps_flag[ i ] ) { | |
| if( num_ref_pic_lists_in_sps[ i ] > 1 && ( i = = 0 \|\| ( i = = 1 && rpl1_idx_present_flag ) ) ) | |
| ref_pic_list_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| slice_poc_lsb_lt[ i ][ j ] | u(v) |

| | Descriptor |
|---|---|
|        delta_poc_msb_present_flag[ i ][ j ] | u(1) |
|        if( delta_poc_msb_present_flag[ i ][ j ] ) | |
|           delta_poc_msb_cycle_lt[ i ][ j ] | ue(v) |
|     } | |
|  } | |
|  if( ( slice_type != I && num_ref_entries[ 0 ][ RplsIdx[ 0 ] ] > 1 )  \|\| | |
|     ( slice_type = = B && num_ref_entries[ 1 ][ RplsIdx[ 1 ] ] > 1 ) ) { | |
|   num_ref_idx_active_override_flag | u(1) |
|   if( num_ref_idx_active_override_flag ) | |
|     for( i = 0; i < ( slice_type = = B ? 2: 1 ); i++ ) | |
|       if( num_ref_entries[ i ][ RplsIdx[ i ] ] > 1 ) | |
|         num_ref_idx_active_minus1[ i ] | ue(v) |
|  } | |
| for( i = 0; i < ( slice_type = = B ? 2: 1 ); i++ ) | |
|  for(j=0;j< NumRefPics[ i ];j++) | |
|   RoiInfo(i,j) | |
| } | |
| } | |

In further embodiments additional constraints are in place:
- Only a reference picture with lower POCs can have RoI Information. As typically RoI switching would with the described feature would apply to Open GOP switching scenarios and therefore the POCs with higher POC would represent already the RoI scene.
- Only one reference picture can have RoI information.

In another embodiment, the RoIInfo( ) is carried in a Picture Parameter Set and the slice header only carries a flag (RoI_flag) per reference picture, indicating whether the RoI information is to be applied or not for resampling (derivation of a scaling factor). The following figure illustrates the principle at with four coded pictures, two before and two pictures after the switching point. At the switching point, the total resolution remains constant but an upsampling of the RoI is carried out. Two PPS are defined, wherein the PPS of the two latter pictures does indicate a RoI within reference pictures. In addition, the slice headers of the two latter pictures carry a RoI_flag[i] for each of their reference pictures, the value is indicated in the figure as "RoI_flag" or "RF=x".

In addition, the slice header could carry for each reference picture not only a RoI_flag as above but in case the flag is true, an additional index into the array of RoIInfo( ) carried in the parameter set to identify which RoI info to apply for a particular reference picture.

FIG. 6a illustrates a current picture with mixed reference pictures.

In the following, a zoom-out case according to a third group of embodiments is described.

Alternative to RoI scalability, in said third group of embodiments, one could consider extended scalability, e.g., going from a RoI picture to a larger area. In such a case, also the cropping window of the referenced picture should be ignored, particularly in case a region in the current decoded picture is identified as being a region for extended scalability, e.g. zooming-out.

FIG. 6b illustrates an example for ignoring a cropping window of a referenced picture in case of a identified region in the current picture.

HorScale=IdentifiedRegionInPicWidth/CodedRefPicWidth

VerScale=IdentifiedRegionInPicHeight/CodedRefPicHeight

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] ISO/IEC, ITU-T. High efficiency video coding. ITU-T Recommendation H.265| ISO/IEC 23008 10 (HEVC), edition 1, 2013; edition 2, 2014.

The invention claimed is:

1. A decoding apparatus comprising a microprocessor and memory, the memory comprising a computer program comprising instructions, which, when executed by the microprocessor, cause the decoding apparatus to:
   decode, from a picture parameter set (PPS) of a video data stream, conformance cropping window parameters comprising a pps_conf_win_left_offset, a pps_conf_win_top_offset, a pps_conf_win_right_offset, and a pps_conf_win_bottom_offset;
   decode, from the picture parameter set (PPS), a pps_scaling_window_explicit_signalling_flag;
   determine that the pps_scaling_window_explicit_signalling_flag has a value of false; and
   based on the determination that the pps_scaling_window_explicit_signalling_flag has a value of false, perform upscaling of a region within a reference picture by using the pps_conf_win_left_offset, the pps_conf_win_top_offset, the pps_conf_win_right_offset, and the pps_conf_win_bottom_offset.

2. The decoding apparatus of claim 1, wherein the computer program comprises instructions, which, when executed by the microprocessor, further cause the decoding apparatus to:
   decode, from a second picture parameter set (PPS) of the video data stream, second conformance cropping window parameters comprising a second pps_conf_win_left_offset, a second pps_conf_win_top_offset, a second pps_conf_win_right_offset, and a second pps_conf_win_bottom_offset;
   decode, from the second picture parameter set (PPS), a second pps_scaling_window_explicit_signalling_flag;
   determine that the second pps_scaling_window_explicit_signalling_flag has a value of true; and
   based on the determination that the second pps_scaling_window_explicit_signalling_flag has a value of true, perform upscaling of a region within a second reference picture without using the second pps_conf_win_left_offset, the second pps_conf_win_top_offset, the second pps_conf_win_right_offset, and the second pps_conf_win_bottom_offset.

3. The decoding apparatus of claim 2, wherein the computer program comprises instructions, which, when executed by the microprocessor, further cause the decoding apparatus to:
   decode, from the second PPS, ROI offset parameters and additional ROI offset parameters,
   wherein the upscaling of the region within the second reference picture is performed by using the ROI offset parameters and additional ROI offset parameters to determine resampled reference picture.

4. The decoding apparatus of claim 3, wherein the computer program comprises instructions, which, when executed by the microprocessor, further cause the decoding apparatus to:
   identify a reference sample by finding a collocated sample using the ROI offset parameters and a motion vector;
   determine that the reference sample is outside an enlarged ROI indicated by the additional offset parameters; and
   based on the determination that the reference sample is outside the enlarged ROI, clip the motion vector.

5. An encoding apparatus comprising a microprocessor and memory, the memory comprising a computer program comprising instructions, which, when executed by the microprocessor, cause the encoding apparatus to:
   encode, into a picture parameter set (PPS) of a video data stream, conformance cropping window parameters comprising a pps_conf_win_left_offset, a pps_conf_win_top_offset, a pps_conf_win_right_offset, and a pps_conf_win_bottom_offset;
   determine to use the pps_conf_win_left_offset, the pps_conf_win_top_offset, the pps_conf_win_right_offset, and the pps_conf_win_bottom_offset to perform upscaling of a region within a reference picture;
   based on the determination to use the pps_conf_win_left_offset, the pps_conf_win_top_offset, the pps_conf_win_right_offset, and the pps_conf_win_bottom_offset to perform upscaling of the region within the reference picture, encode, into the picture parameter set (PPS), a pps_scaling_window_explicit_signalling_flag with a value of false.

6. The encoding apparatus of claim 5, wherein the computer program comprises instructions, which, when executed by the microprocessor, further cause the encoding apparatus to:
   encode, into a second picture parameter set (PPS) of a video data stream, second conformance cropping window parameters comprising a second pps_conf_win_left_offset, a second pps_conf_win_top_offset, a second pps_conf_win_right_offset, and a second pps_conf_win_bottom_offset;
   determine to not use the second pps_conf_win_left_offset, the second pps_conf_win_top_offset, the second pps_conf_win_right_offset, and the second pps_conf_win_bottom_offset for upscaling of a region within a second reference picture;
   based on the determination not to use the second pps_conf_win_left_offset, the second pps_conf_win_top_offset, the second pps_conf_win_right_offset, and the second pps_conf_win_bottom_offset to perform upscaling of the region within the second reference picture,
   encode, into the second picture parameter set (PPS), a second pps_scaling_window_explicit_signalling_flag with a value of true.

7. The encoding apparatus of claim 6, wherein the computer program comprises instructions, which, when executed by the microprocessor, further cause the encoding apparatus to:
   encode, into the second PPS, ROI offset parameters and additional ROI offset parameters,
   wherein the upscaling of the region within the second reference picture is performed by using the ROI offset parameters and additional ROI offset parameters to determine resampled reference picture.

8. The encoding apparatus of claim 7, wherein the computer program comprises instructions, which, when executed by the microprocessor, further cause the encoding apparatus to:
   identify a reference sample by finding a collocated sample using the ROI offset parameters and a motion vector;
   determine that the reference sample is outside an enlarged ROI indicated by the additional offset parameters; and
   based on the determination that the reference sample is outside the enlarged ROI, clip the motion vector.

9. A method for decoding video, the method comprising:
   decoding, from a picture parameter set (PPS) of a video data stream, conformance cropping window parameters comprising a pps_conf_win_left_offset, a pps_conf_win_top_offset, a pps_conf_win_right_offset, and a pps_conf_win_bottom_offset;
   decoding, from the picture parameter set (PPS), a pps_scaling_window_explicit_signalling_flag;
   determining that the pps_scaling_window_explicit_signalling_flag has a value of false; and
   based on the determination that the pps_scaling_window_explicit_signalling_flag has a value of false, performing upscaling of a region within a reference picture by using the pps_conf_win_left_offset, the pps_conf_win_top_offset, the pps_conf_win_right_offset, and the pps_conf_win_bottom_offset.

10. The method of claim 9, the method further comprising:
    decoding, from a second picture parameter set (PPS) of the video data stream, second conformance cropping window parameters comprising a second pps_conf_win_left_offset, a second pps_conf_win_top_offset, a second pps_conf_win_right_offset, and a second pps_conf_win_bottom_offset;
    decoding, from the second picture parameter set (PPS), a second pps_scaling_window_explicit_signalling_flag;
    determining that the second pps_scaling_window_explicit_signalling_flag has a value of true; and
    based on the determination that the second pps_scaling_window_explicit_signalling_flag has a value of true, performing upscaling of a region within a second reference picture without using the second pps_conf_win_left_offset, the second pps_conf_win_top_offset, the second pps_conf_win_right_offset, and the second pps_conf_win_bottom_offset.

11. The method of claim 10, the method further comprising:
    decoding, from the second PPS, ROI offset parameters and additional ROI offset parameters,
    wherein the upscaling of the region within the second reference picture is performed by using the ROI offset parameters and additional ROI offset parameters to determine resampled reference picture.

12. The method of claim 11, the method further comprising:
    identifying a reference sample by finding a collocated sample using the ROI offset parameters and a motion vector;
    determining that the reference sample is outside an enlarged ROI indicated by the additional offset parameters; and
    based on the determination that the reference sample is outside the enlarged ROI, clipping the motion vector.

13. A method for encoding video, the method comprising:
    encoding, into a picture parameter set (PPS) of a video data stream, conformance cropping window parameters comprising a pps_conf_win_left_offset, a pps_conf_win_top_offset, a pps_conf_win_right_offset, and a pps_conf_win_bottom_offset;
    determining to use the pps_conf_win_left_offset, the pps_conf_win_top_offset, the pps_conf_win_right_offset, and the pps_conf_win_bottom_offset to perform upscaling of a region within a reference picture;
    based on the determination to use the pps_conf_win_left_offset, the pps_conf_win_top_offset, the pps_conf_win_right_offset, and the pps_conf_win_bottom_offset to perform upscaling of the region within the reference picture,
    encoding, into the picture parameter set (PPS), a pps_scaling_window_explicit_signalling_flag with a value of false.

14. The method of claim 13, the method further comprising:
    encoding, into a second picture parameter set (PPS) of a video data stream, second conformance cropping window parameters comprising a second pps_conf_win_left_offset, a second pps_conf_win_top_offset, a second pps_conf_win_right_offset, and a second pps_conf_win_bottom_offset;
    determining to not use the second pps_conf_win_left_offset, the second pps_conf_win_top_offset, the second pps_conf_win_right_offset, and the second pps_conf_win_bottom_offset for upscaling of a region within a second reference picture;
    based on the determination not to use the second pps_conf_win_left_offset, the second pps_conf_win_top_offset, the second pps_conf_win_right_offset, and the second pps_conf_win_bottom_offset to perform upscaling of the region within the second reference picture, encoding, into the second picture parameter set (PPS), a second pps_scaling_window_explicit_signalling_flag with a value of true.

15. The method of claim 14, the method further comprising:

encoding, into the second PPS, ROI offset parameters and additional ROI offset parameters, wherein the upscaling of the region within the second reference picture is performed by using the ROI offset parameters and additional ROI offset parameters to determine resampled reference picture.

16. The method of claim 15, the method further comprising:

identifying a reference sample by finding a collocated sample using the ROI offset parameters and a motion vector;

determining that the reference sample is outside an enlarged ROI indicated by the additional offset parameters; and based on the determination that the reference sample is outside the enlarged ROI, clipping the motion vector.

* * * * *